US006794039B2

(12) United States Patent
Huusken

(10) Patent No.: US 6,794,039 B2
(45) Date of Patent: Sep. 21, 2004

(54) FLAME RETARDANT RESIN COATING

(75) Inventor: Robert Huusken, Nederweert (NL)

(73) Assignee: Trespa International, B.V., Weert (NL)

( * ) Notice: Subject to any disclaimer, the term of this patent is extended or adjusted under 35 U.S.C. 154(b) by 132 days.

(21) Appl. No.: 09/878,254

(22) Filed: Jun. 11, 2001

(65) Prior Publication Data

US 2002/0013391 A1 Jan. 31, 2002

(30) Foreign Application Priority Data

Jun. 23, 2000 (DE) .......................... 100 30 658

(51) Int. Cl.[7] ............................... B32B 9/04
(52) U.S. Cl. ................ 428/411.1; 428/424; 428/423.1; 428/447; 428/480; 428/500; 524/127; 524/140
(58) Field of Search .......................... 428/411.1, 423.1, 428/414, 447, 480, 500; 524/127, 140

(56) References Cited

U.S. PATENT DOCUMENTS

| 3,914,513 | A |   | 10/1975 | Brown et al. ............... 428/425 |
| 3,915,777 | A |   | 10/1975 | Kaplan ....................... 156/202 |
| 4,010,137 | A |   | 3/1977  | Brady .................. 260/45.8 NT |
| 4,619,956 | A | * | 10/1986 | Susi ............................ 524/87 |
| 4,670,483 | A | * | 6/1987  | Hall et al. .................. 523/179 |
| 4,740,527 | A | * | 4/1988  | von Bonin .................. 521/105 |
| 4,743,624 | A | * | 5/1988  | Blount ....................... 521/106 |
| 4,857,364 | A | * | 8/1989  | von Bonin .................. 427/254 |
| 4,950,757 | A | * | 8/1990  | Tomko et al. .............. 544/195 |
| 5,238,745 | A |   | 8/1993  | Valet et al. ................. 428/413 |
| 5,298,067 | A | * | 3/1994  | Valet et al. ................. 106/506 |
| 5,576,357 | A |   | 11/1996 | Bayer et al. ................ 522/170 |
| 5,578,666 | A | * | 11/1996 | Weil et al. .................. 524/100 |
| 5,804,680 | A |   | 9/1998  | Plundrich et al. ........... 536/274 |
| 6,013,704 | A | * | 1/2000  | Hayoz et al. ............... 524/100 |
| 6,031,032 | A |   | 2/2000  | Horacek et al. ............ 524/100 |
| 6,184,375 | B1 | * | 2/2001 | Huglin et al. ............... 544/116 |

FOREIGN PATENT DOCUMENTS

| EP | 0 440 580 A2 | 8/1991 | |
| JP | 02178359 A * | 7/1990 | ................ 526/278 |
| WO | WO 94/10223 | 5/1994 | |
| WO | WO 96/07678 | 3/1996 | |
| WO | WO 96/09344 | 3/1996 | |
| WO | WO 99/45061 | 9/1999 | |

OTHER PUBLICATIONS

Chemical Abstracts, vol. 89: 111478.

* cited by examiner

Primary Examiner—James J. Seidleck
Assistant Examiner—Melanie Bissett
(74) Attorney, Agent, or Firm—Roberts & Roberts, L.L.P.

(57) ABSTRACT

A flame retardant resin coating which comprises a flame retardant base resin and a transparent resin top layer. The base resin is selected from the group consisting of polyester, polyether, epoxy, polyurethane, and acrylic acrylates, melamine acrylates, and silicone (meth)acrylates and comprises color pigments and flame retardant additives. The base resin further comprises color pigments and at least one flame retardant additive ranging from about 2.5 to about 50% by weight, based on the weight of base resin. The flame retardant additive is preferably selected from the group consisting of melamine polyphosphates, melamine pyrophosphates, ammonium polyphosphates, and mixtures thereof. Furthermore, the transparent resin comprises at least one sterically hindered amine.

24 Claims, 2 Drawing Sheets

FLAME RETARDANT RESIN COATING

BACKGROUND OF THE INVENTION

1. Field of the Invention

The invention relates to a flame retardant resin coating comprising a flame retardant base resin and a transparent resin top layer.

2. Description of the Related Art

The use of melamine phosphate and condensed melamine phosphates, such as dimelamine pyrophosphates, to render plastics flame retardant is known in the art. U.S. Pat. No. 4,010,137 describes the use of such flame retardants in polyolefins, and U.S. Pat. No. 3,915,777 describes their use in coatings.

As shown in Chemical Abstracts, Vol. 89: 111478, it is known that melamine phosphate, converted into dimelamine pyrophosphate by the elimination of water, is used as a flame retardant in polyamide that has been filled with a calcium silicate. It has been found that when melamine phosphate and condensed melamine phosphates, such as dimelamine pyrophosphate, are used in polyamides absent fiber reinforcement the results with regard to flame retardancy are unsatisfactory since the desired fire classes are not attained.

WO 96/09344 discloses a flame retardant, glass fiber reinforced polyamide resin compound which comprises from 10 to 40% by weight melamine phosphate, melamine pyrophosphate, particularly dimelamine pyrophosphate or melamine polyphosphate, and mixtures thereof. Further preferred nonhalogen flame retardants which may be present in the polyamide resin compound include zinc borate, zinc phosphate, melamine sulfate or ammonium polyphosphate. Additionally, customary additives, such as lubricants, dispersants, and adhesion promoters may be added, such as stearates, phosphonates, fatty acid amides or Aerosils. Glass fiber reinforced polyamide resin compounds of this type are especially suitable for producing moldings used in the electrical or electronics industry.

WO 99/45061 describes composite materials comprising a fiber material and/or woven material which is impregnated with a resin matrix and cured. The resin matrix, based on a reactive epoxy/anhydride resin, is flame retarded with reactively incorporated phosphorus compounds based on acid derivatives. The flame retardant composite material further comprises fillers, defoamers, leveling assistants, adhesion promoters, and reaction accelerants which are customary in epoxy resin chemistry, such as tertiary amine and/or imidazole or organometallic complexes, for example. The phosphorus content, based on the resin matrix, is from 0.5 to 5% by weight. Composite materials of this kind are used as lightweight materials in vehicle construction, for example, for rail vehicles, bodies of motor vehicles, and marine and aircraft components.

For masking and encapsulating electronic components, WO 94/10223 discloses storage stable and readily curable one component reactive resin systems comprising a mixture of commercially used epoxy resins and phosphorus-containing glycidyl esters, especially diglycidyl phosphonate, and cationic photoinitiators. These reactive resin systems are not curable by means of heat alone, and may be prepared at high temperatures of up to 150° C. Even after the reactive resin system has been activated with UV radiation, it remains liquid at room temperature for several months, thereby permitting undisrupted operation. The activated reactive resin system is heat curable at temperatures from 100° C. to 150° C. In the course of curing, the reactive phosphorus component is incorporated into the reactive resin molding, from which it does not migrate even when said molding undergoes temperature exposure. The properties of flame retardancy conferred by the phosphorus additive on the reactive resin molding are therefore retained. A result of the phosphorus compounds present in the reactive resin system is that the system, which cannot be cured without photoinitiator, is cured rapidly and completely with the photoinitiator, and does not require an additional accelerant.

WO 96/07678 discloses a UV curable one component reactive resin comprising a phosphorus-containing acrylate, a further unsaturated compound capable of free-radical copolymerization with acrylates, and a free-radical photoinitiator system. The phosphorus-containing acrylates may be mixed with a very wide variety of commercially customary acrylate components to give storage stable reactive resins which are suitable for masking electronic components and which, by UV irradiation, cure fully into flame retardant masking compounds. The phosphorus-containing acrylate is obtained as a product of a variety of reactions. For example, a hydroxyalkyl phosphorus compound may be reacted with an isocyanatoalkyl (meth)acrylate or with a methacrylic acid isocyanate. It is likewise possible to react a dihydroxyalkyl phosphorus compound with an active (meth)acrylic acid derivative, or an epoxy phosphorus compound with a hydroxyalkyl (meth)acrylate.

It would be desirable to provide a flame retardant colored resin coating suitable for application to articles exposed to outdoor weathering or to humid, thermal and/or chemical conditions, which colored resin coating remains substantially free from color changes. The present invention provides a solution to this problem.

SUMMARY OF THE INVENTION

The present invention provides a flame retardant resin coating comprising a flame retardant base resin and a transparent resin top layer, wherein the base resin comprises color pigments and from about 2.5 to about 50% by weight, based on the weight of the base resin, of flame retardant additives selected from the group consisting of melamine polyphosphates, melamine pyrophosphates, ammonium polyphosphates, and mixtures thereof; and wherein the transparent resin comprises from about 0.5 to about 2% by weight, based on the weight of the transparent resin, of at least one sterically hindered amine.

DETAILED DESCRIPTION OF THE PREFERRED EMBODIMENT

Figure 1:
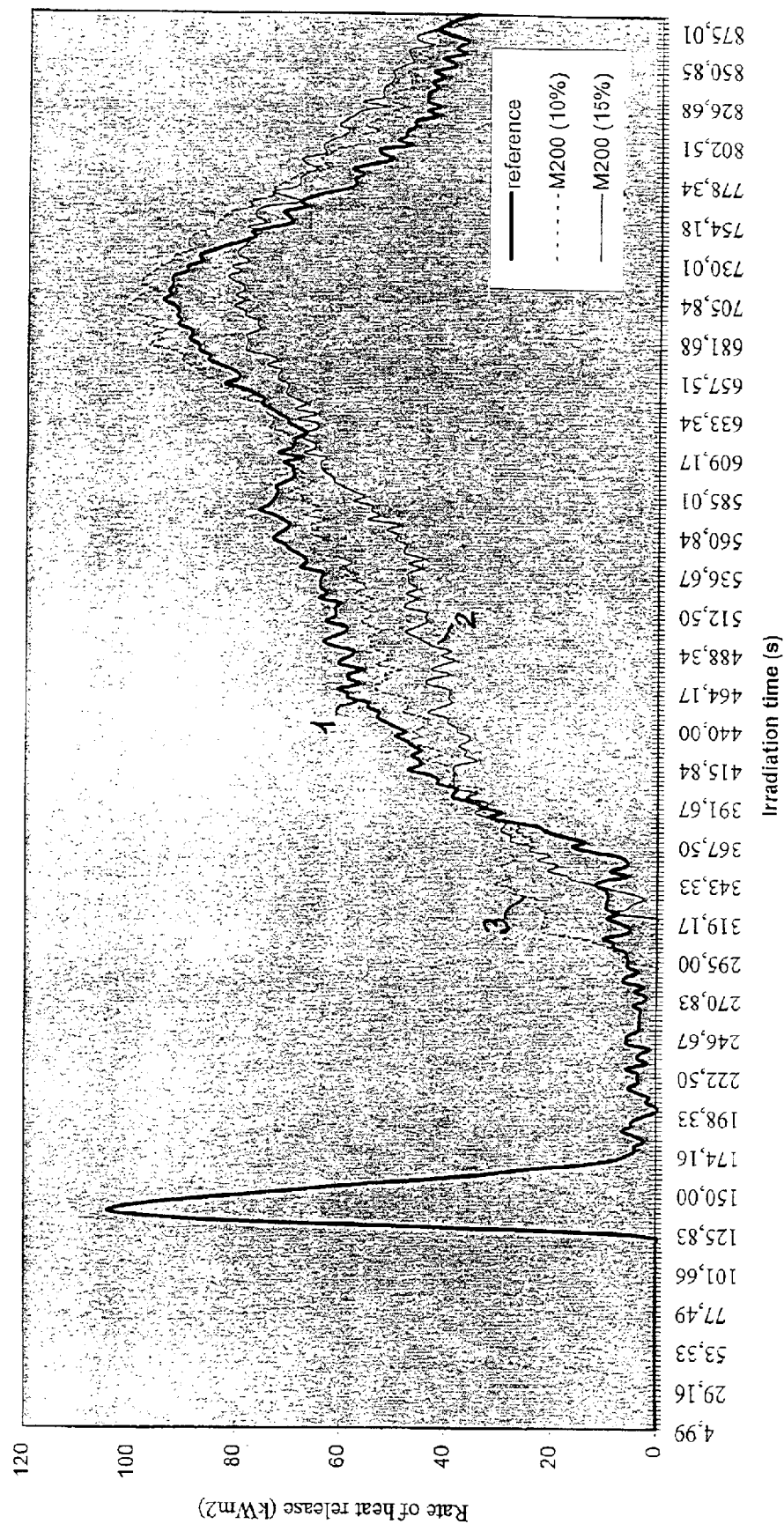
FIG. 1 shows a plot of heat release rates were plotted against irradiation time for melaminepolyphosphate Melapur® 200 at 10% and 15% vs. a reference.

A flame retardant resin coating is provided according to the invention. This coating comprises a flame retardant base resin and a transparent resin top layer. Such resin coatings exhibit superior, substantially constant color properties and, even with small fractions of phosphorus compounds, offer high flame retardancy. Furthermore, after various weathering tests these resin coatings remain crack free. The invention also provides an article comprising a substrate, and the flame retardant resin coating on the substrate. The flame retardant resin coated article finds use as a top layer of panels for the exterior cladding of buildings, for wall facings and gravel stops, balcony facings, parapet slabs, for wet rooms and laboratories.

According to the invention, the base resin comprises a polymer which may be selected from polyesters, polyethers, epoxies, polyurethanes, and acrylic acrylates, melamine acrylates, and silicone (meth)acrylates. In a further embodiment of the invention, the base resin comprises phosphorus-containing polyurethanes obtained by copolymerizing a polymer precursor with monomers, said polymer precursor comprising a) a polymerizable unsaturated bond;
b) an oxycarbonyl or iminocarbonyl group;
c) a free hydroxyl group or a functional group obtainable by reacting a free hydroxyl group with an appropriate electrophile; and
d) a terminal group, containing phosphorus and oxygen, at the end of a carbon chain, and at least one group selected from a phosphorus hydroxyl group and, optionally, a substituted hydrocarbyl group connected via an oxy group to a phosphorus atom, and being substantially free from halogen-containing groups and having a molecular weight (mass number Mn for a polymer) of from about 200 to about 5000 daltons, and, optionally, a viscosity of less than about 14,000 mPa.s.

The base resin may comprise phosphorus-containing polyurethanes obtained by copolymerizing an organic compound or a polymer with monomers, the organic compound or the polymer comprising at least one unsubstituted or substituted cycloalkoxy group in which at least one of the ring atoms is oxygen, the cycloalkoxy group being connected to at least one unsubstituted or α-substituted alkylenylcarbonyloxy group having at least one active hydrogen atom α to the carbonyl group, wherein a) at least one cycloalkoxy group may optionally react with a phosphate ester to form a terminal phosphate ester group which has a hydroxyl group on the β carbon atom; and/or
b) at least one alkylene carbonyl group may optionally react with a H-phosphonate ester to form a terminal phosphonate ester group β to a carbonyloxy group, and, optionally, at least one cycloalkoxy group may react with a carboxylic acid group conjugated with an unsaturated group, to form a carbonyloxyhydroxyalkyl group which is adjacent to an unsaturated carbon bond, and in one or both cases the resultant product contains at least one phosphorus atom, at least one hydroxyl group and at least one polymerizable unsaturated carbon bond.

In one embodiment of the invention, the base resin comprises polyurethane (meth)acrylate, formed from a group of resins from UCB n.v., B-1620 Drogenbos, which is preparable by reacting the polyurethane with a compound containing at least one phosphorus-containing group, at least one (meth)acrylate group, and at least one functional group which reacts with at least one of the end groups of the polyurethane to form a covalent bond. Preferably, said phosphorus-containing group comprises a phosphate or phosphonate group and said (meth)acrylate group is part of a (meth)acryloyloxy group. The functional group, which reacts with an end group of the polyurethane to form a covalent bond, preferably comprises a hydroxyl group, more preferably a primary or secondary hydroxyl group. Most preferably, from one to three (meth)acryloyloxy groups present.

The base resin preferably comprises from about 2.5 to about 50% by weight, based on the weight of the base resin, of at least one flame retardant additive selected from the group consisting of melamine polyphosphates, melamine pyrophosphates, ammonium polyphosphates, and mixtures thereof. A preferred flame retardant additive comprises melamine polyphosphate of formula $(C_3H_8N_6)_n\square(HPO_3)_m$, where m and n are natural numbers. The preferred molar ratio of phosphorus to melamine ranges, for example, from about 1:0.5 to about 1:3 and more preferably from about 1:1 to about 1:1.5. Another suitable flame retardant comprises ammonium polyphosphate whose particles have been microencapsulated in a resin whose water solubility ranges from about 0.06 to about 0.19 g/100 g water at a temperature of about 20° C. A further preferred flame retardant comprises dimelamine pyrophosphate of structural formula:

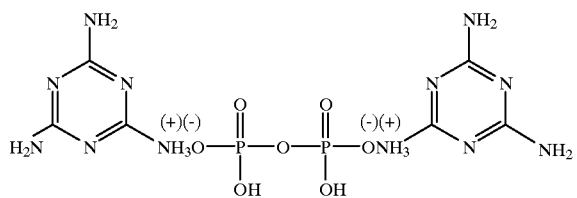

Flame retardant additives used according to the invention preferably comprise a phosphorus content ranging from about 2.5 to about 50% by weight, more preferably from about 12 to about 15% by weight, based on the weight of the respective additive.

The flame retardant additives described above, based on salts of phosphoric acid with ammonia and melamine, are preferred. Flame retardant additives of comparable activity are provided by salts of phosphorous acid $P(OH)_3$ (phosphites), a phosphonic acid $O=P(OH)_2R$ (phosphonates), a phosphonous acid $P(OH)_2R$ phosphonites, a phosphinic acid $O=P(OH)R_2$ (phosphinates), a phosphinous acid $P(OH)R_2$ (phosphinites) with ammonia and melamine. Further examples of suitable flame retardant additives nonexclusively include poly salts and pyro salts of the three first-mentioned acids, namely phosphorous acid, phosphonic acid, phosphonous acid, ammonia and melamine.

Besides melamine and ammonia, other nitrogen compounds are also suitable, based on derivatives and melamine precursors. Examples of such nonexclusively include melamine polymers, partially hydrolyzed melamine, urea and its derivatives, (di)cyanamides, guanamides such as acetoguanamide, benzoguanamide, etc. Together with one or more of the aforementioned acids, these compounds preferably give rise to corresponding salts having an ionic structure. Covalent structures are also possible.

These compounds and salts may be employed alone or in any conceivable mixture with one another.

In the selection of the flame retardant additives, unreactive additives which are halogenated compounds are excluded owing to their inadequate UV stability. Electron beam curable additives are generally very expensive and particularly sensitive to severe fluctuations in temperature and humidity, and so result in unwanted cracking in the resin coating. Highly suitable flame retardant additives, which gave good results in the weathering tests on the resin coated substrates in whose resin coating these additives were present, are the commercially available ammonium polyphosphates from Chemische Fabrik Budenheim, Germany, which are sold under the tradenames FR Cros 484 EC, FR Cros 486, and FR Cros 488. These ammonium polyphosphates are microencapsulated in a silane resin or epoxy resin and have a water solubility of from 0.06 to 0.19 g/100 g water at a temperature of 20° C.

Likewise very good results were given by the commercially available flame retardant additives dimelamine pyrophosphate (trade name Budit 311), dimelamine orthophosphate (trade name Budit 310), and monomelamine orthophosphate (trade name Budit 312) from Budenheim and also by melamine polyphosphate (trade name Melapur® 200) from DSM, Geleen, the Netherlands.

The base resin further comprises color pigments which give the coating material of the invention a certain coloring. The coloring is determined by means of a color measurement in accordance with DIN 5033, in conjunction with a calorimetric evaluation of color distances of surface colors according to the CIELAB formula in accordance with DIN 6174. Tristimulus values are used for unambiguous characterization of a color stimulus. For this purpose, three independent numbers are necessary and sufficient. A color stimulus may therefore be represented by a point in a three-dimensional area in the so-called color space. For characterization, it is possible to make direct use of the color values related to a primary system, the tristimulus values of a surface color being based on a completely matte white surface. The tristimulus values are preferably described by the standard colorimetric system, in which the color stimulus is described by the 10° tristimulus values X, Y, and Z, which are defined in the standard DIN 5033 Part 2. For instance, for color measurement, a resin coating of the invention was applied to a sample and the surface color of this sample was determined first of all. Subsequently, this sample was subjected to various standard weathering tests and the color stimulus of the weathered sample was determined. The difference between original color stimulus and color stimulus after weathering gives a maximum color difference, dE, was in the range from about 0.5 to about 2.0. Where the color difference dE is greater than about 2.0, the coloring of the resin coating alters as a result of weathering to an extent such that a plate with such a coating is unsuitable for long-term use and is therefore removed at the quality control stage.

According to the invention, the transparent resin top layer preferably comprises from about 0.5 to about 5% by weight, based on the weight of the transparent resin, of at least one UV absorber. In one embodiment of the invention, the UV absorbers are based on triazine, benzylidene-malonate, hydroxy-phenylbenzotriazoles, 2-hydroxybenzophenones or oxalanilide. The UV absorber based on hydroxyphenyl-s-triazine is preferably present in an amount of from about 0.5 to about 5% by weight, more preferably from about 1 to about 4% by weight, based on the weight of the transparent resin, in the transparent resin. Such UV absorbers have, for example, the following structural formula:

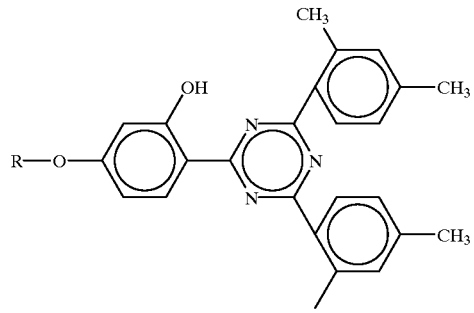

The transparent resin top layer preferably further comprises a sterically hindered amine light stabilizer. According to the invention, the transparent resin top layer comprises from about 0.5 to about 2% by weight, based on the weight of the transparent resin, of at least one sterically hindered amine. Amines of this kind have, for example, the following structural formula:

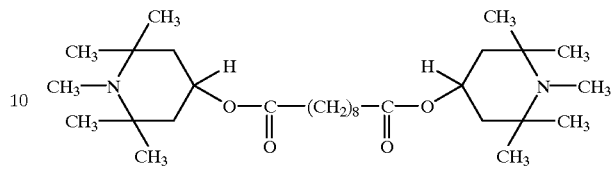

The weathering stability of the resin coating is influenced by the amount of flame retardant additives in the base resin in such a way that the susceptibility of the coating to UV irradiation, hydrolysis, and other weathering phenomena is increased. In order to counter this unwanted increase in susceptibility, it is particularly important to strengthen the resistance to UV radiation, since by this means the weathering stability is stabilized. This is done by means of the above-described UV absorbers in a transparent layer which covers the base resin of the resin coating. The UV radiation is able directly to break chemical bonds in the polymers, since the photon energy, which is a function of the wavelength, falls within the range of chemical bond energy. In the absence of oxygen, the free radicals which are formed result in chemical crosslinking. In the presence of oxygen, photooxidation occurs, and may be initiated even by visible light. This gives rise to a cyclical chain reaction which yields a hydroperoxide which is present in the polymer chain and may lead to chain scission. The free radicals formulated in the chain reaction may be deactivated by primary stabilizers, which, for example, comprise sterically hindered phenols and amines. These are able to form highly stable free radicals which are unable to initiate chain reactions and which instead, conversely, scavenge the aggressive peroxy radicals. Particularly effective are sterically hindered amines, also called HALS (hindered amine light stabilizers), in which the nitrogen is incorporated in a cycloaliphatic piperidyl ring. The sterically hindered amines provide steric shielding of free radicals which are scavenged.

The following non-limiting examples serve to illustrate the invention. It will be appreciated that variations in proportions and alternatives in elements of the components of the invention will be apparent to those skilled in the art and are within the scope of the present invention.

EXAMPLE 1

Xenon 1200 Test

A resin coating according to the invention was tested in accordance with the specification TNO 158/89. In this test, a sample with a resin coating undergoes long-term exposure to xenon lamps for 3000 hours. This corresponds to about 10 years' service under natural sunlight in western European climate zones. The light sources are three xenon lamps each with an output of 4500 watts. The light intensity is 90±5 W/m² in the wavelength range 300–400 nm. The ambient temperature is 30° C., the black standard temperature 45±3° C., and the relative humidity 65±5%. The sample is sprayed cyclically with water for 3 minutes, the individual cycle lasting 20 minutes; i.e., 17 minutes after the beginning of the cycle, the spraying phase begins and lasts 3 minutes. The water is distilled. The sample runs around a circular track along whose periphery the xenon lamps are positioned, each with a spacing of 120° from one another. After the sample has made one circuit, it is turned by 180°, so that the two sides are exposed in a 50/50 proportion.

EXAMPLE 2
Climatic Alteration Test

A resin coating is formed according to the invention. This test reflects in particular the water solubility of flame retardant additives used according to the invention. The higher their water solubility, the more likely cracks are to appear in the resin coating.

The test comprises 15 cycles, each individual cycle lasting for 48 hours in a climate chamber and being subdivided into 4 sections as follows:

12 hours at 20° C., 65% relative humidity
12 hours at 80° C., 5% relative humidity
12 hours at 80° C., 90% relative humidity, and
12 hours at −20° C., 0% relative humidity.

EXAMPLE 3
Q-panel Test

A resin coating according to the invention is tested in accordance with the standard ASTM G53-91 and lasts 1000 hours. It shows the color change of the resin coating following UV-B exposure.

EXAMPLE 4
Condensation Chamber Test

A resin coating according to the invention is tested in accordance with the standard DIN 50018 and lasts 50 days. $SO_2$ is added to the condensation water, and the color change and crack resistance of the resin coating are investigated.

EXAMPLE 5
Flame Resistance Test (Cone Calorimeter Test)

Panels measuring 10 cm×10 cm×8 mm were produced with the following layer structure: flame retardancy modified kraft paper, non-flame retardancy modified standard substrate from Westvaco, and resin coating according to the invention with flame retardant in the base resin and decorative layer (transparent layer), which had not been flame retardancy modified. The layer weight was between 90 and 160 g/m².

The test was carried out in accordance with the standard ISO 5660 with an output level of 50 kW and a duration of 720 s. Important investigation criteria are the total heat released, the heat release rate, and the ignition times for the decorative layer and the core layer. Heat release rates were plotted against irradiation time, as shown by the curves depicted in FIGS. 1 and 2. These curves show that after about two to two and a half minutes the transparent coating material and base coating material of the resin material have undergone combustion and within this period they contribute in particular to the release of heat. This fraction of the total heat released is significant. In this test, about 140 g/m² resin coating make a contribution of 10% to the total heat released by these panels. The proportion of this coating is only about 1.5% of the overall panel test weight.

After the resin coating has undergone combustion, there is a period of about 3 to 4 minutes until the substrate ignites. There is a close relationship between the ignition of the resin coating and the ignition of the substrate. Up to a phosphorus content of about 1.4% by weight in the resin coating, the resin coating ignites. This heats the underlying substrate, leading to earlier ignition of the substrate and to a higher total heat released. Where the resin coating contains more than about 1.4% by weight phosphorus, ignition of the resin coating is suppressed. A resin coating with from about 10 to about 15% by weight melamine polyphosphate contains, for example, from about 1.5 to about 2.3% by weight phosphorus. As a result, the ignition of the substrate is substantially retarded, resulting in a substantially lower figure for heat released. If the phosphorus fraction in the resin coating is raised, for example, to about 4% by weight this has substantially no great effect on the ignition time for the substrate. In other words, the additional phosphorus fraction in the resin coating is not accompanied by additional flame retardancy.

In all of the examples of Table 1 below, the transparent coating material of the resin coating was an aliphatic urethane acrylate. For the base coating material, or base coating, an aliphatic urethane acrylate comprising color pigments, flame retardant additives in different concentrations, and customary base coating additives was used.

The base coating materials were colored with two different color pigments which have the following code names: pure white A05.0.0 and brown A08.8.1.

In Table 1 it is evident that the resin coatings passed the weathering tests with complete satisfaction, without the occurrence of incipient cracks or fractures. Table 2 summarizes comparative examples containing flame retardant unreactive additives such as, for example, chlorine-containing polyphosphonate (Sandoflam 5087), tris(2-chloroisopropyl) phosphate (Fyrol PCF), tris(2-chloroethyl) phosphate (Fyrol CEF), FR Cros 484 EC, in the base resin. With all of these additives it is found that incipient cracks and fractures occur in the resin coating in the course of the weathering tests.

Additionally, the electron beam curable flame retardant additives such as Polysurf HPACE.

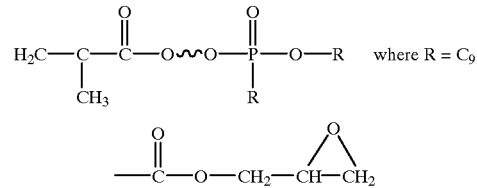

Polysurf HP
with HP: R=H, and
Polysurf HPH
with HPH: R=$C_{12}$–$C_{14}$, and also

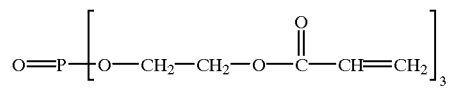

tris(acryloyloxyethyl) phosphate (V-3PA)
exhibit an intolerable number of incipient cracks and fractures after the weathering tests.

Figure 2:
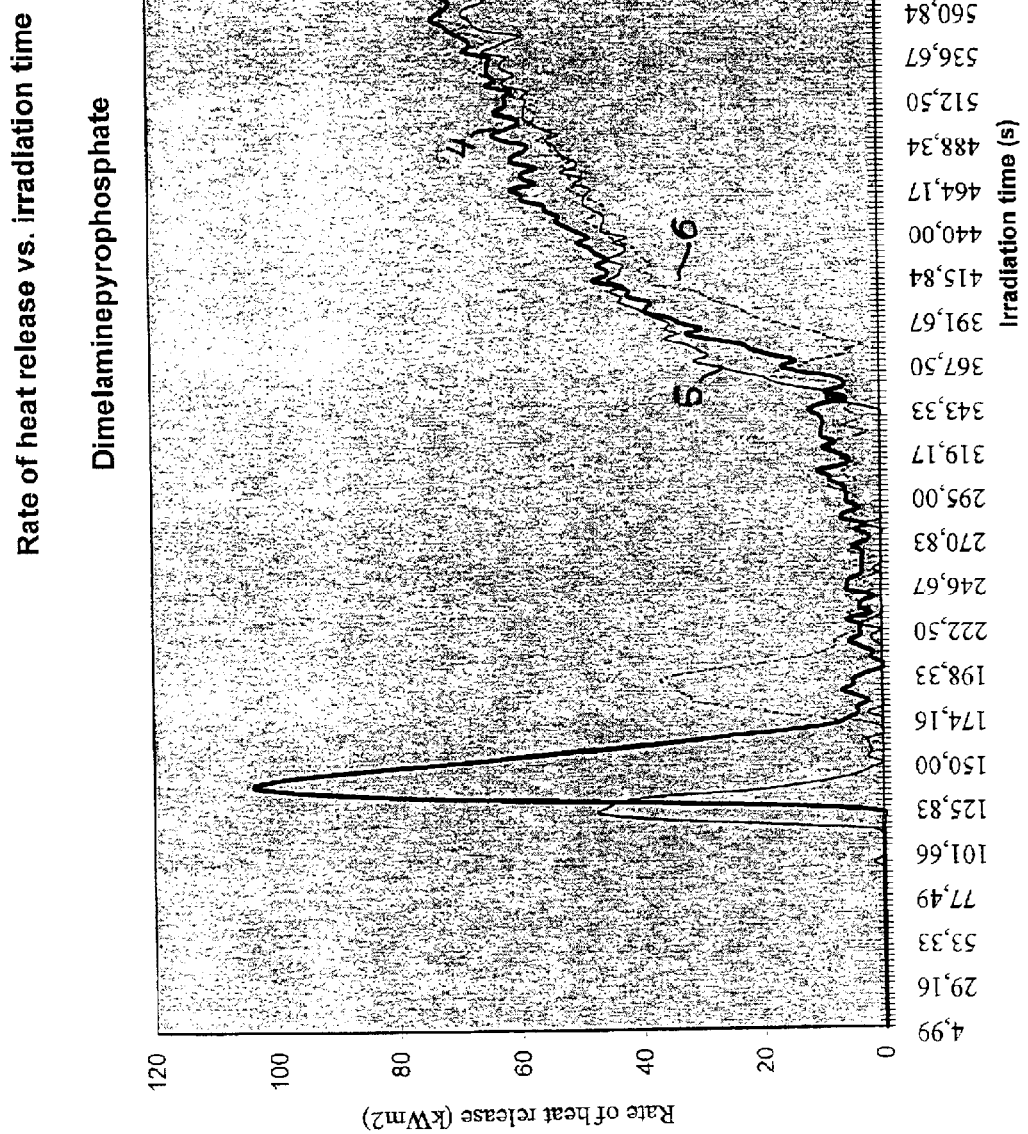
FIG. 2 shows shows a plot of heat release rates were plotted against irradiation time for melaminepolyphosphate Budit 311 at 10% and 15% vs. a reference.

The curves depicted in FIGS. 1 and 2 show the amounts of heat released during the flame resistance test as a function of the irradiation time. In FIGS. 1 and 2 a resin coating without flame retardant is plotted as a reference curve 1 and 4, respectively. It is found that the resin coating comprising base resin and transparent resin undergoes combustion after just a short period of irradiation and releases about 10% of the total heat. In FIG. 1, the flame retardant in the base resin is melamine polyphosphate (Melapur® 200), in one instance with a fraction of 15% by weight—see curve 2—and in one instance with a fraction of 10% by weight—see curve 3. These percentages are based on the weight of the base resin. It is found that the higher phosphorus fraction of curve 2 lowers the rate of heat release relative to curve 3, and thus the carbonization of the substrate of the sample plate proceeds more slowly.

Similar results are obtained with the flame retardant dimelamine pyrophosphate (Budit 311) in the base resin, as is evident from the curves 4 to 6 in FIG. 2. Curve 5 shows the course of the amount of heat released for a fraction of 15% by weight dimelamine pyrophosphate in the base resin, and curve 6 shows this course for a fraction of 10% by weight dimelamine pyrophosphate in the base resin. Here again, the higher phosphorus fraction of curve 5 lowers the rate of heat release relative to curve 6, and, accordingly, the carbonization of the substrate of the sample plate proceeds more slowly.

TABLE 1

Inventive resin coatings with flame retardant additives

| Ex | Base coating material color | Transparent coating material | Flame retardant | Based on base coating material % P | Color difference dE (CMC) | Natural sunlight xenon (3000 h) dE (CMC) | Natural sunlight xenon (3000 h) surface insp | UV-B radiation Q-panel (1000 h) dE (CMC) | UV-B radiation Q-panel (1000 h) surface insp | Condensation chamber and SO$_2$ dE (CMC) | Condensation chamber and SO$_2$ surface insp | Climate test dE (CMC) | Climate test surface insp. |
|---|---|---|---|---|---|---|---|---|---|---|---|---|---|
| 1 | A08.8.1 | urethane acrylate | Melapur 200 | 1.5 | 0.96 | 0.36 | ok | 0.4 | ok | 0.08 | ok | 0.09 | ok |
| 2 | A08.8.1 | urethane acrylate | Melapur 200 | 3 | 1.68 | 0.28 | ok | 0.61 | ok | 0.13 | ok | 0.17 | ok |
| 3 | A05.0.0 | urethane acrylate | Melapur 200 | 1.5 | 0.64 | 0.59 | ok | 1.66 | ok | 0.48 | ok | 4.44 | ok |
| 4 | A05.0.0 | urethane acrylate | Melapur 200 | 3 | 0.63 | 0.47 | ok | 2.94 | ok | 0.32 | ok | 4.03 | ok |
| 5 | A08.8.1 | urethane acrylate | Budit 311 | 1.5 | 0.82 | 0.28 | ok | 1.02 | ok | 0.08 | ok | — | ok |
| 6 | A08.8.1 | urethane acrylate | Budit 311 | 1.5 | 0.75 | 0.34 | ok | 1.40 | ok | 0.15 | ok | — | ok |
| 7 | A05.0.0 | urethane acrylate | Melapur 200 | 1.5 | 0.56 | 1.66 | ok | 1.07 | ok | 0.31 | ok | 4.88 | ok |
| 8 | A05.0.0 | urethane acrylate | Melapur 200 | 2.25 | 0.42 | 1.73 | ok | 0.85 | ok | 0.14 | ok | 4.03 | ok |
| 9 | A05.0.0 | urethane acrylate | Melapur 200 | 3 | 0.74 | 1.39 | ok | 1.26 | ok | 0.16 | ok | 4.02 | ok |
| 10 | A05.0.1 | urethane acrylate | Melapur 200 | 3.75 | 1.51 | 0.67 | ok | 1.68 | ok | 0.42 | ok | 3.99 | ok |
| 11 | A05.0.0 | urethane acrylate | Budit 311 | 1.5 | 0.73 | 1.63 | ok | 1.07 | ok | 0.10 | ok | 3.25 | ok |
| 12 | A05.0.0 | urethane acrylate | Budit 311 | 2.25 | 0.97 | 1.08 | ok | 1.09 | ok | 0.10 | ok | 3.77 | ok |
| 13 | A05.0.0 | urethane acrylate | Budit 311 | 3 | 1.32 | 1.38 | ok | 1.42 | ok | 0.24 | ok | 3.57 | ok |
| 14 | A08.8.1 | urethane acrylate | Melapur 200 | 1.5 | 0.40 | 0.21 | ok | 1.00 | ok | 0.30 | ok | — | ok |
| 15 | A08.8.1 | urethane acrylate | Melapur 200 | 2.25 | 0.61 | 0.40 | ok | 0.98 | ok | 0.11 | ok | — | ok |
| 16 | A08.8.1 | urethane acrylate | Melapur 200 | 3 | 0.84 | 0.62 | ok | 1.22 | ok | 0.16 | ok | — | ok |
| 17 | A08.8.1 | urethane acrylate | Melapur 200 | 3.75 | 0.89 | 0.88 | ok | 1.30 | ok | 0.24 | ok | — | ok |
| 18 | A08.8.1 | urethane acrylate | Burlit 311 | 1.5 | 0.10 | 0.15 | ok | 1.04 | ok | 0.33 | ok | — | ok |
| 19 | A08.8.1 | urethane acrylate | Budit 311 | 2.25 | 0.33 | 0.22 | ok | 1.21 | ok | 0.10 | ok | — | ok |
| 20 | A08.8.1 | urethane acrylate | Budit 311 | 3 | 0.49 | 0.35 | ok | 1.44 | ok | 0.08 | ok | — | ok |
| 21 | A08.81 | urethane acrylate | Budit 311 | 3.75 | 0.68 | 0.49 | ok | 1.39 | ok | 0.09 | ok | — | ok |

—: not measured

TABLE 2

Comparative examples of resin coatings with nonreactive additives and with electron beam curable additives

| Ex | Base coating material color | Transparent coating material | Flame retardant | Based on base coating material % P | Color difference dE (CMC) | Natural sunlight xenon (3000 h) dE (CMC) | Natural sunlight xenon (3000 h) surface insp | UV-B radiation Q-panel (1000 h) dE (CMC) | UV-B radiation Q-panel (1000 h) surface insp | Condensation chamber and SO$_2$ dE (CMC) | Condensation chamber and SO$_2$ surface insp | Climate test dE (CMC) | Climate test surface insp |
|---|---|---|---|---|---|---|---|---|---|---|---|---|---|
| V1 | A05.0.0 | urethane acrylate | Polysurf HPACE | 1.5 | 0.29 | 0.4 | ok | 1.59 | cracks | — | — | 5.17 | cracks |
| V2 | A05.0.0 | urethane acrylate | Polysurf HPH | 1.08 | 1.12 | 1.91 | cracks | 6.15 | cracks | — | — | 7.49 | cracks |

TABLE 2-continued

Comparative examples of resin coatings with nonreactive additives and with electron beam curable additives

| Ex | Base coating material color | Transparent coating material | Flame retardant | Based on base coating material % P | Color difference dE (CMC) | Natural sunlight xenon (3000 h) dE (CMC) | Natural sunlight xenon (3000 h) surface insp | UV-B radiation Q-panel (1000 h) dE (CMC) | UV-B radiation Q-panel (1000 h) surface insp | Condensation chamber and SO$_2$ dE (CMC) | Condensation chamber and SO$_2$ surface insp | Climate test dE (CMC) | Climate test surface insp |
|---|---|---|---|---|---|---|---|---|---|---|---|---|---|
| V3 | A05.0.0 | urethane acrylate | Polysurf HP | 2 | 0.63 | 0.35 | cracks | 2.13 | cracks | — | — | 5.61 | cracks |
| V4 | A05.0.0 | Urethane acrylate | V-3PA | 1.32 | 0.91 | 0.56 | ok | 0.53 | ok | 0.16 | ok | 3.71 | cracks |
| V5 | A05.0.0 | urethane acrylate | Sandoflam 5087 | 2.5 | 3.85 | 0.91 | cracks | 7.83 | cracks | — | — | 7.73 | cracks |
| V6 | A05.0.0 | urethane acrylate | Fyrol PCF | 1.58 | 5.47 | 1.59 | cracks | 9.92 | cracks | — | — | 4.11 | cracks |
| V7 | A05.0.0 | urethane acrylate | Fyrol CEF | 1.83 | 5.41 | 1.52 | cracks | 14.32 | ok | — | — | 3.93 | cracks |
| V8 | A05.0.0 | urethane acrylate | FR Cross 484 EC | 3 | 0.6 | 0.62 | ok | 1.53 | ok | — | — | 2.59 | flood |
| V9 | A08.8.1 | urethane acrylate | Hostaflam Ap 462 | 3 | 0.81 | 0.21 | ok | 0.74 | ok | 0.17 | ok | 1.12 | flood |
| V10 | A08.8.1 | urethane acrylate | FR Cross 484 EC | 3 | 0.18 | 0.52 | ok | 0.60 | ok | 0.20 | ok | 0.9 | flood |
| V11 | A08.8.1 | urethane acrylate | FR Cross 486 | 3 | 0.26 | 0.60 | ok | 0.58 | ok | 0.32 | ok | 1.22 | flood |
| V12 | A08.8.1 | urethane acrylate | FR Cross 488 | 3 | 0.30 | 0.23 | ok | 0.90 | ok | 0.41 | ok | 0.98 | flood |

—: not tested

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A flame retardant resin, coating comprising a flame retardant base resin and a transparent resin top layer, wherein the base resin comprises color pigments and from about 2.5 to about 50% by weight, based on the weight of the base resin, of at least one flame retardant additive selected from the group consisting of melamine polyphosphates, melamine pyrophosphates, ammonium polyphosphates, and mixtures thereof; and wherein the transparent resin comprises from about 0.5 to about 2% by weight, based on the weight of the transparent resin, of at least one sterically hindered amine.

2. The flame retardant resin coating of claim 1, wherein the base resin is selected from the group consisting of polyester, polyether, epoxy, polyurethane, acrylic acrylates, melamine acrylates, and silicone (meth)acrylates.

3. The flame retardant resin coating of claim 2, wherein the base resin comprises phosphorus-containing polyurethanes obtained by copolymerizing a polymer precursor with monomers, said polymer precursor comprising:
 a) a polymerizable unsaturated bond;
 b) an oxycarbonyl or iminocarbonyl group;
 c) a free hydroxyl group or a functional group obtainable by reacting a free hydroxyl group with an appropriate electrophile; and
 d) a terminal group, containing phosphorus and oxygen, at the end of a carbon chain, and at least one group selected from a phosphorus hydroxyl group and, optionally, a substituted hydrocarbyl group connected via an oxy group to a phosphorus atom, and being substantially free from halogen-containing groups and having a molecular weight (mass number Mn for a polymer) of from about 200 to about 5000 daltons, and, optionally, a viscosity of less than about 14,000 mPa.s.

4. The flame retardant resin coating of claim 2, wherein the base resin comprises phosphorus-containing polyurethanes obtained by copolymerizing an organic compound or a polymer with monomers, said organic compound or polymer comprising at least one unsubstituted or substituted cycloalkoxy group in which at least one of the ring atoms is oxygen, the cycloalkoxy group being connected to at least one unsubstituted or (i-substituted alkylenylcarbonyloxy group having at least one active hydrogen atom a to the carbonyl group, wherein
 a) at least one cycloalkoxy group may optionally react with a phosphate ester to form a terminal phosphate ester group which possesses a hydroxyl group on the β carbon atom; and/or
 b) at least one alkylene carbonyl group may optionally react with a H-phosphonate ester to form a terminal phosphonate ester group β to a carbonyloxy group, and, optionally, at least one cycloalkoxy group may react with a carboxylic acid group conjugated with an unsaturated group, to form a carbonyloxyhydroxyalkyl group which is adjacent to an unsaturated carbon bond, and, in one or both cases, the resultant product contains at least one phosphorus atom, at least one hydroxyl group and at least one polymerizable unsaturated carbon bond.

5. The flame retardant resin coating of claim 1, wherein the transparent resin contains from about 0.5 to about 5% by weight, based on the weight of the transparent resin, of at least one UV absorber.

6. The flame retardant resin coating of claim 1, comprising a melamine polyphosphate of formula $(C_3H_8N_6)_n \cdot (HPO_3)_m$, where n and m are natural numbers and the molar ratio of phosphorus to melamine ranges from about 1:0.5 to about 1:3.

7. The flame retardant resin coating of claim 1, comprising a melamine polyphosphate of formula $(C_3H_8N_6)_n \cdot (HPO_3)_m$, where n and m are natural numbers and the molar ratio of phosphorus to melamine ranges from about 1:1 to about 1.5:1.

8. The flame retardant resin coating of claim 1, comprising a dimelamine pyrophosphate of structural formula:

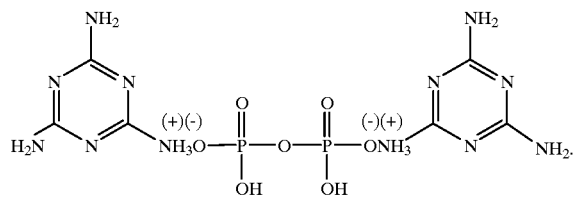

9. The flame retardant resin coating of claim 1, comprising a dimelamine orthophosphate of structural formula:

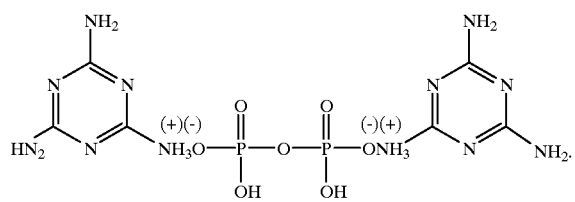

10. The flame retardant resin coating of claim 1, comprising a monomelamine orthophosphate of structural formula:

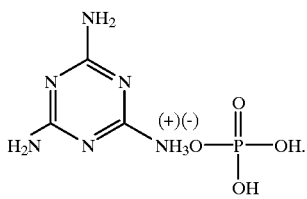

11. The flame retardant resin coating of claim 1, wherein the particles of ammonium polyphosphate are microencapsulated in a resin whose water solubility ranges from about 0.06 to about 0.19 g/100 g water at a temperature of about 20° C.

12. The flame retardant resin coating of claim 1, wherein the flame retardant additives have a phosphorus content of from about 2.5 to about 50% by weight, based on the weight of the respective additive.

13. The flame retardant resin coating of claim 5, wherein the UV absorber comprises triazine, benzylidene-malonate, hydroxyphenylbenzotriazoles, 2-hydroxybenzophenones or oxalanilide.

14. The flame retardant resin coating of claim 13, wherein a UV absorber comprising hydroxyphenyl-s-triazine is present in the transparent resin at from about 0.5 to about 5% by weight, based on the weight of the transparent resin.

15. The flame retardant resin coating of claim 14, wherein hydroxyphenyl-s-triazine is present at 1 to 4% by weight in the transparent resin.

16. The flame retardant resin coating of claim 1, wherein the base resin comprises a polyurethane (meth)acrylate which is prepared by reacting a polyurethane with a compound containing at least one phosphorus-containing group, at least one (meth)acrylate group, and at least one functional group which reacts with at least one end group of the polyurethane to form a covalent bond.

17. The flame retardant resin coating of claim 16, wherein the phosphorus-containing group comprises a phosphate or phosphonate group.

18. The flame retardant resin coating of claim 16, wherein the (meth)acrylate group is part of a (meth)acryloyloxy group.

19. The flame retardant resin coating of claim 16, wherein the functional group which reacts with an end group of the polyurethane to form a covalent bond comprises a hydroxyl group.

20. The flame retardant resin coating of claim 18 wherein the polyurethane(meth)acrylate comprises from about 1 to about 3 (meth)acryloyloxy groups.

21. The flame retardant resin coating of claim 1, wherein the base resin comprises at least one flame retardant additive selected from the group consisting of salts of phosphorous acid, a phosphonic acid, a phosphorous acid, a phosphinic acid and/or a phosphinous acid with ammonia and melamine.

22. The flame retardant resin coating of claim 1, wherein the base resin comprises at least one flame retardant additive selected from the group consisting of poly salts and pyro salts of phosphorous acid, a phosphonic acid, and/or a phosphonous acid with ammonia and melamine.

23. The flame retardant resin coating of claim 1, wherein the base coating material comprises color pigments which provide an initial coloration to the resin coating, and wherein said initial coloration may undergo a color change comprising a maximum color difference, dE, of from about 0.5 to about 2.0 from the initial coloration.

24. An article comprising a substrate, and the flame retardant resin coating of claim 1 on the substrate.

* * * * *